United States Patent
Jung et al.

(10) Patent No.: US 9,462,415 B2
(45) Date of Patent: Oct. 4, 2016

(54) METHOD OF SEARCHING FOR CONTACT NUMBER AND ELECTRONIC DEVICE FOR SUPPORTING SAME

(71) Applicant: Samsung Electronics Co., Ltd., Gyeonggi-do (KR)

(72) Inventors: Heejae Jung, Gyeonggi-do (KR); Jangseong Kim, Gyeonggi-do (KR); Junghwan Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/618,420

(22) Filed: Feb. 10, 2015

(65) Prior Publication Data

US 2015/0237467 A1     Aug. 20, 2015

(30) Foreign Application Priority Data

Feb. 17, 2014  (KR) ........................ 10-2014-0017614

(51) Int. Cl.
*H04W 4/02* (2009.01)
*H04W 4/12* (2009.01)
*H04M 3/42* (2006.01)

(52) U.S. Cl.
CPC ........... *H04W 4/02* (2013.01); *H04M 3/42348* (2013.01); *H04W 4/12* (2013.01)

(58) Field of Classification Search
CPC .... H04W 4/02; H04W 4/12; H04M 3/42348
USPC .................. 455/414, 414.3, 456; 340/539.13
See application file for complete search history.

(56) References Cited

U.S. PATENT DOCUMENTS

| | | | | |
|---|---|---|---|---|
| 6,407,698 B1 * | 6/2002 | Ayed | ...................... | G01S 1/047 342/357.31 |
| 8,533,204 B2 * | 9/2013 | Serrano | ............. | G06F 17/30277 707/749 |
| 2004/0176935 A1 * | 9/2004 | Sproule | .................. | G07C 5/008 703/8 |
| 2014/0038640 A1 * | 2/2014 | Wesselius | .............. | G08G 1/202 455/456.1 |

FOREIGN PATENT DOCUMENTS

KR   10-2011-0072538   6/2011
KR   10-1263199        5/2013

* cited by examiner

*Primary Examiner* — Kamran Afshar
*Assistant Examiner* — Farid Seyedvosoghi
(74) *Attorney, Agent, or Firm* — The Farrell Law Firm, P.C.

(57) ABSTRACT

A method of searching for a contact number by a host device is provided. The method includes receiving a signal for requesting vehicle data of a first mobile station and a location value of a second mobile station; receiving a location value and flag information of the first mobile station; determining the location value of the first mobile station based on the flag information; determining whether a difference between the determined location value of the first mobile station and the location value of the second mobile station is less than or equal to a predetermined threshold location value; extracting the vehicle data of the first mobile station based on the determination result as to whether the difference is less than or equal to the predetermined threshold location; and transmitting the extracted vehicle data of the first mobile station.

16 Claims, 7 Drawing Sheets

METHOD OF SEARCHING FOR CONTACT NUMBER AND ELECTRONIC DEVICE FOR SUPPORTING SAME

PRIORITY

This application claims priority under 35 U.S.C. §119(a) to a Korean Patent Application filed on Feb. 17, 2014 in the Korean Intellectual Property Office and assigned Serial No. 10-2014-0017614, the entire contents of which are incorporated herein by reference.

BACKGROUND

1. Field of the Invention

The present invention relates to a method of searching for a contact number and an electronic device for supporting the same, and more particularly, to a method in which a user searches for a contact number using a vehicle number, and an electronic device for supporting the same.

2. Description of the Related Art

A driver frequently parks his/her vehicle in various places. The parked vehicle may cause inconvenience to other people. Therefore, the driver may leave a message having his/her phone number inside the vehicle to enable other people to easily communicate therewith.

In addition, the driver may leave a driver call service agency's phone number inside the vehicle, instead of his/her phone number. In this case, the driver must sign up for a membership in advance. Then, if the driver inputs his/her phone number, the driver is allocated a unique number corresponding to the phone number. The unique number may be set as the driver's vehicle number.

In the related art, the driver takes a risk by exposing his/her phone number to many random people. The driver's exposed phone number may be arbitrarily collected by other people for applications of sending various types of scam messages, such as chauffeur service messages and loan guidance messages, which may cause unexpected inconvenience to the driver.

In addition, other people must closely approach the driver's vehicle to obtain the agency's main number. Furthermore, the driver cannot identify another drivers contact number while being in his/her vehicle or driving the vehicle.

SUMMARY

The present invention has been made to address the above-identified problems and disadvantages, and to provide at least the advantages described below. Accordingly, an aspect of the present invention provides a method of searching for a contact number and an electronic device for supporting the same.

In accordance with an aspect of the present invention, a method of searching for a contact number by a host device is provided. The method includes receiving a signal for requesting vehicle data of a first mobile station and a location value of a second mobile station; receiving a location value and flag information of the first mobile station; determining the location value of the first mobile station based on the flag information; determining whether a difference between the determined location value of the first mobile station and the location value of the second mobile station is less than or equal to a predetermined threshold location value; extracting the vehicle data of the first mobile station based on the determination result as to whether the difference is less than or equal to the predetermined threshold location; and transmitting the extracted vehicle data of the first mobile station.

In accordance with another aspect of the present invention, a host device is provided. The host device includes a wireless communication unit configured to receive a signal for requesting vehicle data of a first mobile station, a location value of a second mobile station, and a location value and flag information of the first mobile station; and a controller configured to determine a location value of the first mobile station based on the flag information, judge whether a difference between the determined location value of the first mobile station and the location value of the second mobile station is less than or equal to a predetermined threshold location value, and extract the vehicle data of the first mobile station based on the judgment result as to whether the difference is less than or equal to the predetermined threshold location.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EXEMPLARY EMBODIMENTS OF THE PRESENT INVENTION

Figure 1:
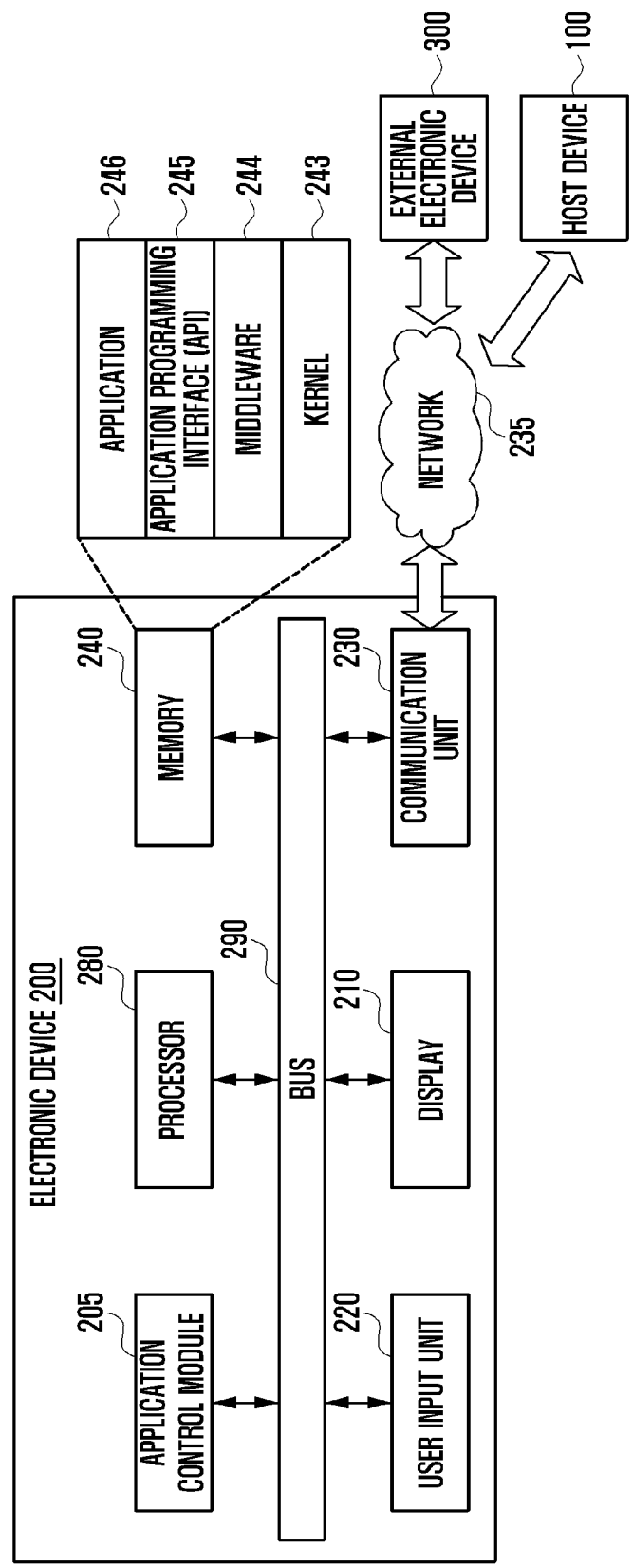
FIG. 1 illustrates a network environment including an electronic device according to an embodiment of the present invention.

Hereinafter, an electronic device according to various embodiments of the present invention will be described with reference to the accompanying drawings, in various embodiments of the present invention, the term "user" may indicate a person using an electronic device or a device (e.g. an artificial intelligence electronic device) using an electronic device.

The term "vehicles" described herein may refer to all means of transportation travelling on a road or a railroad. For example, vehicles may include cars, vans, and motorcycles. Vehicles may store data, communicate with an external device, and connect to an electronic device. In addition, vehicles may include a Global Positioning System (GPS) capable of determining and receiving a location thereof or an electronic device having a GPS as one component thereof.

Various embodiments of the present invention will be described in conjunction with the accompanying drawings. The present invention may have various embodiments, and modifications and changes may be made therein. Therefore, the present invention will be described in detail with reference to embodiments shown in the accompanying drawings. However, it should be understood that there is no intent to limit various embodiments of the present invention to the embodiments disclosed, but the present invention should be construed to cover all modifications, equivalents, and alternatives falling within the scope and spirit of the present invention. In the description of the drawings, identical or similar reference numerals are used to designate identical or similar elements.

As used in various embodiments of the present invention, the expressions "include", "may include" and other conjugates refer to the existence of a corresponding disclosed function, operation, or constituent element, and do not limit one or more additional functions, operations, or constituent elements. Further, as used in various embodiments of the present invention, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present invention, the expression "or" includes any or all combinations of words enumerated together. For example, the expression "A or B" may include A, may include B, or may include both A and B.

While expressions including ordinal numbers, such as "first" and "second", as used in various embodiments of the present invention may modify various constituent elements, such constituent elements are not limited by the above expressions. For example, the above expressions do not limit the sequence and/or importance of the corresponding elements. The expressions may be used to distinguish a component element from another component element. For example, a first user device and a second user device indicate different user devices although both of them are user devices. For example, a first element may be termed a second element, and similarly, a second element may be termed a first element without departing from the scope of various embodiments of the present invention.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present invention are merely for the purpose of describing embodiments and are not intended to limit the various embodiments of the present invention. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present invention.

An electronic device according to embodiments of the present invention may be a device including a communication function. For example, the electronic device may include at least one of a smart phone, a tablet Personal Computer (PC), a mobile phone, a video phone, e-book reader, a desktop PC, a laptop PC, a netbook computer, a Personal Digital Assistant (PDA), a Portable Multimedia Player (PMP), an Moving Picture Experts Group Audio Layer 3 (MP3) player, a mobile medical device, a camera, a wearable device (e.g., a Head-Mounted-Device (HMD) such as electronic glasses, electronic clothes, an electronic bracelet, an electronic necklace, an electronic appcessory, an electronic tattoo, or a smart watch).

According to embodiments of the present invention, the electronic device may be a smart home appliance with a communication function. The smart home appliance as an example of the electronic device may include at least one of a television, a Digital Video Disk (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to embodiments of the present invention, the entity may include at least one of various medical appliances (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FOR), an in-vehicle infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point of Sale (POS) of a store.

According to embodiments of the present invention, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present invention may be a combination of one or more of the aforementioned various devices. Further, the electronic device according to various embodiments of the present invention may be a flexible device. Further, it will be apparent to those skilled in the art that the electronic device according to various embodiments of the present invention is not limited to the above-mentioned devices.

Hereinafter, an electronic device and a method of controlling an operation thereof according to various embodiments of the present invention are described with reference to the accompanying drawings. In various embodiments of the present invention, the term "user" may indicate a person using an electronic device or a device (for example, an artificial intelligence electronic device) using an electronic device. The configurations of the electronic device according to various embodiments of the present invention and the method of controlling the operation thereof are not restricted by or limited to contents which are described below and therefore, it should be noted that they may be applied to various embodiments based on the embodiments which are described below. In embodiments of the present invention described below, a hardware approach is described as an example. However, since the embodiments of the present invention include a technology using both hardware and software, the present invention does not exclude a software-based approach.

FIG. 1 is a block diagram illustrating a network environment 235 that includes an electronic device 200 according to an embodiment of the present invention. Referring to FIG. 1, the electronic device 200 (e.g., a first terminal) includes a bus 290, a processor 280, a memory 240, a user input unit 220, a display 210, a communication unit 230, and an application control module 205.

The bus 290 is a circuit which interconnects the above-described elements and delivers a communication (e.g., a control message) between the above-described elements.

The processor 280 receives commands from the above-described other elements (e.g., the memory 240, the user input unit 220, the display 210, the communication unit 230, the application control module 205, etc.) via the bus 290, interprets the received commands, and executes a calculation or processes data according to the interpreted commands.

The memory 240 stores commands or data received from the processor 280 or other elements (e.g., the user input unit 220, the display 210, the communication unit 230, the application control module 205, etc.) or generated by the processor 280 or the other elements. The memory 240 includes programming modules, such as a kernel 243, middleware 244, an Application Programming Interface (API) 245, an application 246, and the like. Each of the above-described programming modules may be implemented in software, firmware, hardware, or a combination of two or more thereof.

The kernel 243 controls or manages system resources (e.g., the bus 290, the processor 280, the memory 240, etc.) used to execute operations or functions implemented by other programming modules (e.g., the middleware 244, the API 245, and the application 246). Also, the kernel 243 provides an interface capable of accessing and controlling or managing the individual elements of the electronic device 200 (for example, a first terminal) by using the middleware 244, the API 245, or the application 246.

The middleware 244 serves as a go between for the API 245, the application 246, and the kernel 243 so that the API 245 or the application 246 can communicate with the kernel 243 and exchange data therewith. Also, in relation to work requests received from one or more applications 246 and/or the middleware 244, for example, load balancing of the work requests may be performed by using a method of assigning a priority, in which system resources (e.g., the bus 290, the processor 280, the memory 240, etc.) of the electronic device 200 can be used by at least one of the one or more applications 246. The API 245 is an interface through which the application 246 is capable of controlling a function provided by the kernel 243 or the middleware 244, and includes, for example, at least one interface or function for file control, window control, image processing, character control, or the like.

According to various embodiments of the present invention, the applications 246 may include a Short Message Service (SIBS)/Multimedia Message Service (MMS) application, an email application, a calendar application, an alarm application, a health care application (for example, an application for measuring an amount of exercise or a level of blood sugar), and an environmental information application (for example, an application for measuring atmospheric pressure, humidity, temperature, and the like). Additionally or alternately, the applications 246 may include an application related to an information exchange between the electronic device 200 and an external device (for example, an external electronic device 300, for example, a second terminal). The application related to the information exchange may include, for example, a notification relay application for transmitting information to the external device, or a device management application for managing the external device.

For example, the notification relay application may include a function for transferring, to the external device (for example, the external electronic device 300), notification information generated from other applications of the electronic device 200 (for example, an SMS/MMS application, an e-mail application, a health management application, an environmental information application, and the like). Additionally or alternatively, the notification relay application may receive notification information from, for example, an external device (for example, the external electronic device 300), and provide the some to a user. The device management application, for example, may manage (for example, install, delete, or update) at least some functions (for example, turning on or off an external device (or some elements of the external device) or adjusting the brightness (or resolution) of a display) of an external device (for example, the external electronic device 300) that communicates with the electronic device 200 (for example, the first terminal), applications performed in the external device, or services (for example, a phone call service, or a messaging service) provided from the external device.

The application control module 205 manages at least one of the functions of the external device (for example, the external electronic device 300), the application operating in the external device, or the services (e.g., call service or message service) provided by the external device.

For example, at least one of the functions of the external device may include the turn-on/off function of the external device (or, some of the components of the external device). At least one of the functions of the external device may include a control function regarding the brightness (or resolution) of the display 210. The management of the services may include installing the service, deleting the service, or updating the service.

According to various embodiments of the present invention, the applications 246 may include an application designated according to a property (for example, a kind of the external electronic device 300) of the external device (for example, the electronic device 200). For example, when the external device is an MP3 player, the applications 246 includes an application related to the reproduction of music. Similarly, when the external device is a mobile medical appliance, the applications 246 includes an application related to health care. According to an embodiment of the present invention, the applications 246 include at least one of an application designated to the electronic device 200 and an application received from the external device (for example, the host device 100 or the external electronic device 300).

The user input unit 220 transfers an instruction or data input from a user via an input/output device (for example, a sensor, a keyboard, or a touch screen) to the processor 280, the memory 240, and the communication unit 230 via, for example, the bus 290. For example, the user input unit 220 provides the processor 280 with data on a user's touch input via a touch screen. Also, the user input unit 220 may output a command or data received from the processor 280, the memory 240, and the communication unit 230, for example, via the bus 290, to an input/output device (for example, a speaker or a display). For example, the user input unit 220 outputs voice data processed via the processor 280 to a user via a speaker.

The display 210 displays various pieces of information (for example, multimedia data or text data) to a user.

The communication unit 230 connects communication between the electronic device 200 and the external device (for example, the external electronic device 300 or the host device 100). For example, the communication unit 230 is connected to a network 235 via wireless or wired communication to communicate with the external device. Wireless communication may include at least one of, for example, Wireless Fidelity (Wi-Fi), Bluetooth (BT), Near Field Communication (NFC), Global Positioning System (GPS) and a cellular communication (for example, Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM) or the like), Wired communication may include at least one of, for example, Universal Serial Bus (USB), High Definition Multimedia Interface (HDMI), Recommended Standard 232 (RS-232), and Plain Old Telephone Service (POTS).

According to an embodiment of the present invention, the network 235 is a communication network. The communication network includes at least one of a computer network, the Internet, the Internet of Things, and a telephone network. According to an embodiment of the present invention, a protocol (for example, a transport layer protocol, a data link layer protocol, or a physical layer protocol) for communication between the electronic device 200 and an external device (e.g., the host device 100 or the external electronic device 300) may be supported by at least one of the applications 246, the API 245, the middleware 244, the kernel 243, and the communication unit 230.

The application control module 205 processes at least one of data received from other elements (e.g., the processor 280, the memory 240, the user input unit 220, or the communication unit 230, etc) and provides the processed data to a user in a variety of ways. For example, the application control module 205 may recognize information regarding a component connected to the electronic device 200. The application control module 205 may store the information regarding the connected component in the memory 240 of the electronic device 200. And, the application control module 205 may execute the application 246 based on the information regarding a component connected to the electronic device 200.

Figure 2:
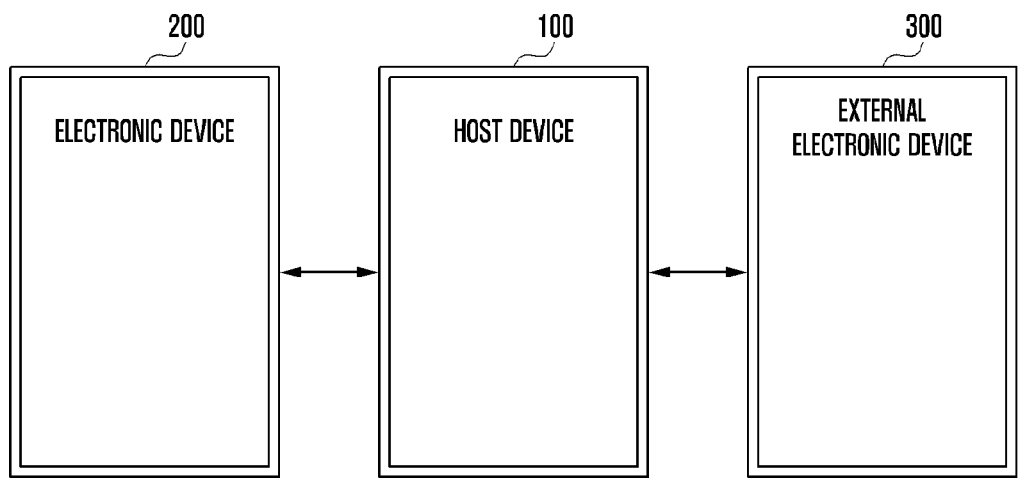
FIG. 2 illustrates a network for searching for a contact number according to an embodiment of the present invention.

FIG. 2 illustrates a configuration of a network for searching for a contact number according to an embodiment of the present invention.

According to an embodiment of the present invention, a network may be established between an electronic device 200 (e.g. a first mobile station), an external electronic device 300 (e.g. a second mobile station), and another device (e.g., a host device 100). Here, the electronic device 200 and the external electronic device 300, as examples of an electronic device, may include constitutions that will be described with reference to FIG. 4. The host device 100 may include constitutions that will be described with reference to FIG. 3. In addition, although not illustrated in FIG. 2 to help with comprehension of the present invention, the electronic device 200 and the external electronic device 300 communicate with each other.

Furthermore, the network according to an embodiment of the present invention may include a telecommunication network, a computer network, and a network using electrical signals.

According to an embodiment of the present invention, the network may be a telecommunication network. The telecommunication network may include at least one of a computer network, the Internet, the Internet of Things, and a telephone network. According to an embodiment of the present invention, a protocol (e.g., a transport lay protocol, a data link layer protocol, or a physical layer protocol) for communication between the electronic device 200 (e.g. a first mobile station) and the external electronic device 300 (e.g. a second mobile station) may be supported by at least one of an application 246, an Application Programming Interface 245, middleware 244, a kernel 243, and a communication interface.

Figure 3:
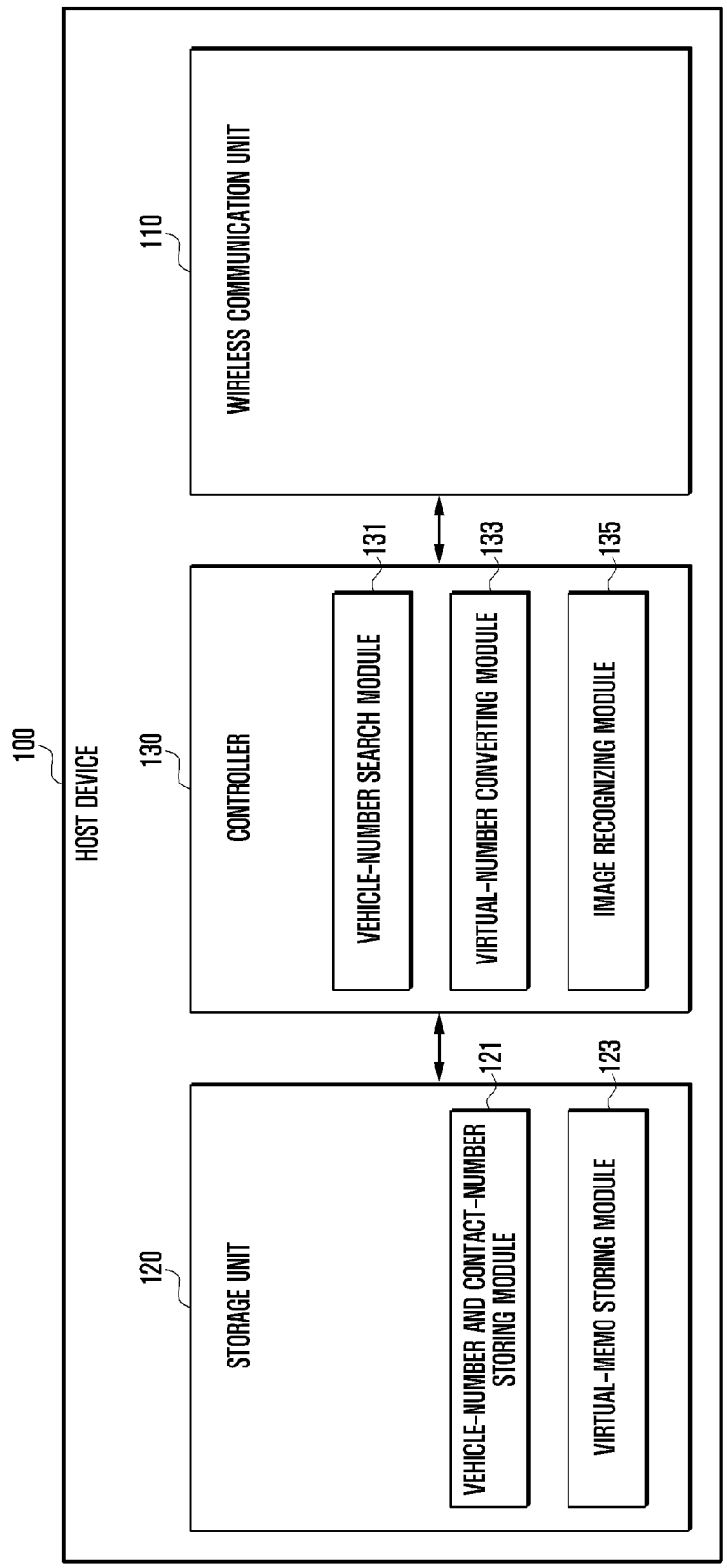
FIG. 3 is a block diagram of a host device according to an embodiment of the present invention.

FIG. 3 is a block diagram of a host device 100 according to an embodiment of the present invention.

The host device 100, an example of an external device, includes a wireless communication unit 110, a storage unit 120, and a controller 130.

The wireless communication unit 110 is a communication module for supporting communication services of the host device 100. The wireless communication unit 110 establishes a communication channel with a communication system. In this case, the wireless communication unit 110 includes a radio frequency transmitter for up-converting and amplifying a frequency of a transmitted signal and a receiver for low-noise amplifying a received signal and down-converting the frequency thereof.

In addition, the wireless communication unit 110 transmits/receives a wireless signal to/from at least one of a base station and an external device in a mobile communication network. The wireless signal may include various types of data according to a voice call signal, a video call signal, or text/multimedia message transmission/reception.

Furthermore, the wireless communication unit 110 performs a function for wireless access of the Internet. Examples of wireless Internet access technology include Wireless Local Area Network (WLAN), Wireless Fidelity (Wi-Fi), Wireless Broadband (WiBro), World Interoperability for Microwave Access (WIMAX), and High Speed Downlink Packet Access (HSDPA).

Moreover, the wireless communication unit 110 may employ Bluetooth, Radio Frequency Identification (RFID), Infrared Data Association (IrDA), Ultra Wideband (UWB), or ZigBee.

According to an embodiment of the present invention, the wireless communication unit 110 receives, from the external electronic device 300 (e.g. the second mobile station), a signal for requesting vehicle data involved in the electronic device 200 (e.g a first mobile station) and a location value of the external electronic device 300 (e.g. the second mobile station). The signal for requesting vehicle data involved in the electronic device 200 includes at least one of a text signal and an image signal for a vehicle number involved in the electronic device 200. For example, the signal for requesting the vehicle data may include a text signal for the vehicle number "05 GA 3212" or an image for the vehicle number acquired via a camera unit 270 of the external electronic device 300 described below. The location value of the external electronic device 300 may be a location value of the external electronic device 300 measured by a sensor unit 250 described below. More specifically, the location value of the external electronic device 300 may be the latitude and longitude of the external electronic device 300.

The wireless communication unit 110 transmits, to the electronic device 200, a signal for requesting a location value of the electronic device 200.

The wireless communication unit 110 receives, from the electronic device 200, the location value and flag information of the electronic device 200. In this case, the location value of the electronic device 200 may include values indicative of the latitude and longitude of the electronic device 200. For example, the location value of the electronic device 200 may be represented by the latitude and longitude thereof (e.g., North 37.5780 and East 126.976°). The flag information may be a value or variable used to represent truth or falseness of a certain status. The flag information according to an embodiment of the present invention may include information as to whether the location value of the vehicle corresponding to the electronic device 200 is a constant location value or a continuously variable location value.

The flag information, as information for identification or a cover page, may be used to determine movement of the electronic device 200. For example, if the electronic device 200 does not move for a predetermined time, the wireless communication unit 110 transmits, to the host device 100, a flag signal to indicate that the electronic device 200 has not moved. If the electronic device 200 continues to move, the wireless communication unit 110 transmits, to the host device 100, a flag signal for representing that the electronic device 200 is moving.

According to an embodiment of the present invention, when the controller 130 extracts the vehicle data involved in the electronic device 200, the wireless communication unit 110 transmits the vehicle data extracted from the external electronic device 300. In addition, when a memo list is changed, the wireless communication unit 110 transmits a memo notification signal to the electronic device 200. For example, when an external device (e.g., the external electronic device 300) transmits a signal for additionally storing a memo in a virtual-memo storing module 123, the wireless communication unit 110 transmit information on the memo and a notification signal to the electronic device associated with the vehicle (e.g., the electronic device 200).

According to an embodiment of the present invention, the wireless communication unit 110 receives a signal for requesting the vehicle data from the external electronic device 300 and then, transmits, to the external electronic device 300, a message informing that the vehicle data involved in the electronic device 200 cannot be extracted, when the vehicle data is not stored in the storage unit 120 or a difference between the location values (e.g. latitudes and longitudes) of the electronic device 200 and the external electronic device 300 is greater than a predetermined threshold location value.

The storage unit 120 includes software for monitoring and controlling the entire network such as managing files in the host device 100. The storage unit 120 includes software for processing service requests between clients. According to an embodiment of the present invention, the storage unit 120 includes a vehicle-number and contact-number storing module 121 and the virtual-memo storing module 123.

The vehicle-number and contact-number storing module 121 stores a user's vehicle number and contact number. The user may access the host device 100 using an electronic device (e.g., the electronic device 200) and stores, in the vehicle-number and contact-number storing module 121, text of his/her own vehicle number or an image of the vehicle number acquired via an image receiving device (e.g., a camera unit 270). Here, the user's access to the host device 100 may refer to activation of a previously stored application in the electronic device and connection of a link.

According to an embodiment of the present invention, the user using the electronic device 200 stores, in the vehicle-number and contact-number storing module 121, a Quick Response (QR) code or barcode designated in advance by the user, instead of the vehicle number. The user may store the vehicle number and personal information in the vehicle-number and contact-number storing module 121, by creating his/her account and password in a program of an application.

According to an embodiment of the present invention, the vehicle-number and contact-number storing module 121 stores a virtual contact number changed by a virtual-number converting module 133.

According to an embodiment of the present invention, the electronic device 200 accesses the host device 100 to store the vehicle number in the vehicle-number and contact-number storing module 121 after a predetermined security procedure. For example, the user using the electronic device 200 stores his/her vehicle number and contact number in the host device 100 after a security procedure, such as user authentication and biometric verification (e.g., pupil verification, fingerprint verification, or voice verification) for an electronic device described in his/her vehicle registration card.

According to an embodiment of the present invention, the virtual-memo storing module 123 stores a memo list in the vehicle corresponding to the vehicle number. The user using the electronic device 200 or the external electronic 300 stores the memo list in the virtual-memo storing module 123. Here, the memo list may include at least one of text, audio, a video, and a moving image. In addition, the users using the electronic device 200 and the external electronic device 300, respectively, may refer to the memo list.

The controller 130 supports execution of an initialization process by controlling a power supply to the components of the host device 100 and controls the components when the initialization process is completed.

According to an embodiment of the present invention, the controller 130 includes at least one of a vehicle-number search module 131, the virtual-number converting module 133, and an image recognizing module 135.

When the wireless communication unit 110 receives a signal for requesting vehicle data involved in the electronic device 200, a location value of the external electronic device 300, and a location value and flag information of the electronic 200, the controller 130 determines the location value of the electronic device 200 based on the flag information. For example, the controller 130 may determine the location value of the electronic device 200 based on constant flag information (e.g. the constant location value of the electronic device 200) if the vehicle associated with the electronic device 200 does not move. In addition, the controller 130 may also determine the location value of the electronic device 200 based on variable flag information (e.g. the changed location value of the electronic device 200) at an arbitrary time point (e.g., at a preset time or when the location value of the electronic device 200 is most recently received) if the vehicle associated with the electronic device 200 continues to move.

The flag information may include a fixed or varied value depending upon activation of the electronic device (e.g., electronic device 200) associated with the vehicle. For example, the activation of the electronic device 200 may mean that the electronic device 200 transmits the changed location information of the vehicle while being electrically connected thereto. By way of example, the electronic device 200 electrically connected to the vehicle may transmit, to the wireless communication unit 110, the updated location value of the vehicle in motion.

The electronic device (e.g., the electronic device 200) may be automatically activated when closely located within a predetermined distance from the vehicle. In addition, the electronic device may activate the association between the electronic device 200 and the vehicle by recognizing at least one of Near Field Communication (NFC), an electronic tag, Radio Frequency Identification (RFID), and a Quick Response (QR) code which are detachably coupled to the vehicle.

According to an embodiment of the present invention, the controller 130 determines whether a difference between the determined location value of the electronic device 200 and the location value of the external electronic device 300 is less than or equal to a predetermined threshold location value. For example, when the electronic device 200 is located at a latitude of 35.678 degrees north and a longitude of 127.976 degrees east, the external electronic device 300 is located at a latitude of 39.678 degrees north and a longitude of 129.076 degrees east, and a predetermined threshold location value corresponds to a latitude of 5 degrees north and a longitude of 5 degrees east, the controller 130 may determine that a difference between the location values is less than or equal to the predetermined threshold location value.

The threshold location value may be determined according to whether the vehicle data of the electronic device 200 requested by the external electronic device 300 corresponds to virtual contact number data or memo list data. For example, the controller 130 may lower the threshold location value when the vehicle data requested by the external electronic device 300 corresponds to virtual contact number data and raise the threshold location value when the vehicle data corresponds to memo list data. In the case of the virtual contact number, a direct call may be made between users; therefore, the controller 130 may lower the threshold location value compared to the memo list data in order to enhance security.

In addition, the threshold location value may be determined depending upon a period in which the location value of the electronic device 200 is updated. The threshold location value may be raised when the location value of the electronic device 200 is seriously changed. In contrast, the threshold location value may be lowered when the location value of the electronic device 200 is constant. For example, during parking or stopping, a vehicle has a fixed location value, which causes a slight change in location information. Therefore, the threshold location value may be adjusted to a lower level. However, when driven, the vehicle has a varying location value; therefore, the threshold location value may be raised to ensure usability of an embodiment of the present invention.

The threshold location value may be determined depending upon activation of the electronic device 200. The activation of the electronic device 200 electrically connected to the vehicle is determined by the user and thus, may be irrelevant to the driving of the vehicle. Accordingly, while the electronic device 200 is being activated, the location information of the vehicle is correct so that the electronic device 200 can be discovered in a narrower range even if the threshold location value is lowered. In contrast, while the electronic device 200 is being inactivated, the location information of the vehicle may be inaccurate so that the electronic device 200 can be discovered in a wider range if the threshold location value is raised.

According to an embodiment of the present invention, the controller 130 extracts vehicle data when the difference between the location values of the electronic device 200 and the external electronic device 300 is less than or equal to the threshold location value. In this case, the vehicle data may include at least one of virtual contact number data and memo list data.

According to an embodiment of the present invention, the vehicle-number search module 131 searches for a vehicle number. The vehicle-number search module 131 determines whether the vehicle number associated with the electronic device 200 has been stored in the vehicle-number and contact-number storing module 121, when the wireless communication unit 110 receives a vehicle-number request signal of the electronic device 200. In the absence of the requested vehicle number associated with the electronic device 200, the vehicle-number search module 131 generates a message informing that the vehicle data cannot be extracted. The generated message is transmitted to the external electronic device 300 via the wireless communication unit 110.

According to an embodiment of the present invention, the virtual-number converting module 133 converts the contact number and memo list of the owner of the vehicle. In addition, when the user inputs a contact number, the vehicle-number and contact-number storing module 121 converts the contact number into a virtual number using the virtual-number converting module 133.

The user stores several contact numbers in the vehicle-number and contact-number storing module 121, and the virtual-number converting module 133 converts all or some of the stored contract numbers into virtual numbers. Here, the virtual number, through which a call may be made to the vehicle user, refers to a number corresponding to and indirectly indicating the contact number of the user. For example, when the user's contact number is 010-2334-3245, the contact number is converted into a random virtual number, such as U.S. Pat. No. 1,425,153, having no relation to the user's contact number.

The virtual number may be determined by the user or may include a random number converted by a random-number generating program. The virtual number may be changed every predetermined periodic or aperiodic time interval. The periodic changing of the virtual number may include changing the virtual number after the user passes user authentication (e.g., password or biometric verification). In addition, the virtual number may have constant digits and may be determined according to the user's location, the status of the vehicle (for example, whether the vehicle stops or moves), and activation or inactivation of the electronic device associated with the vehicle. By way of example, for a vehicle user in Seoul, Korea, the first two digits of a vehicle number may be designated as "02," and for a vehicle user in Gyeonggi-do, the first three digits of a vehicle number may be designated as "031."

According to an embodiment of the present invention, the image recognizing module 135 recognizes the image of the vehicle number using an image receiving device (e.g., a camera or a camcorder). The image recognizing module 135 is used when the vehicle user stores the vehicle number and the contact number and when a request is made to search for the vehicle number of the external electronic device 300. When the wireless communication unit 110 receives the image signal of the vehicle number, the virtual-number converting module 133 converts the image of the vehicle number into text. In addition, the virtual-number converting module 133 may use a program for extracting data from an image.

Figure 4:
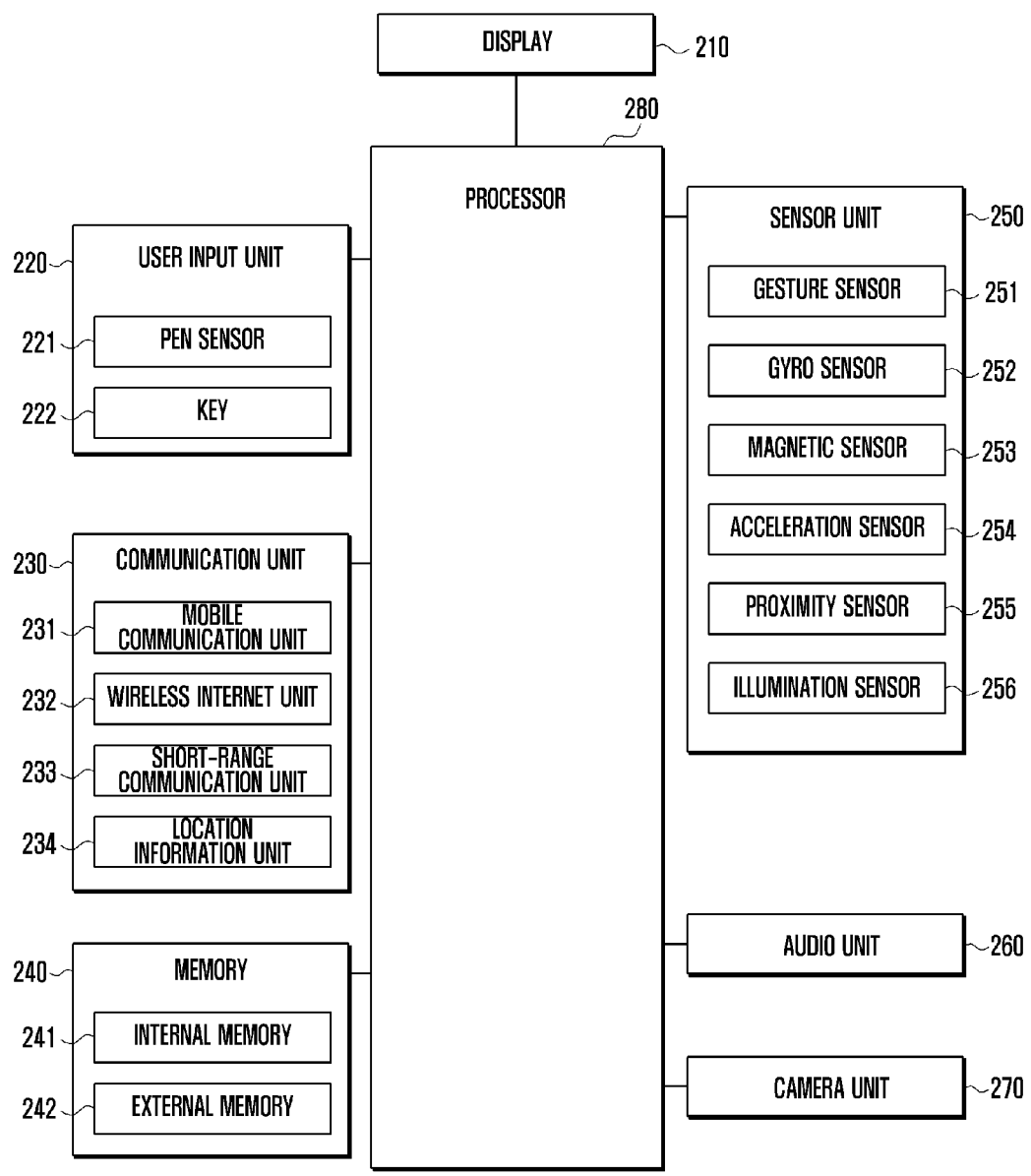
FIG. 4 is a block diagram of a mobile station according to an embodiment of the present invention.

FIG. 4 is a block diagram of the electronic device 200 and the external electronic device 300 according to an embodiment of the present invention. The electronic device 200 and the external electronic device 300 each include a display 210, a user input unit 220, a communication unit 230, a memory 240, a sensor unit 250, an audio unit 260, a camera unit 270, and a processor 280.

Referring to FIG. 4, the display 210 performs a function of displaying images or data to a user. The display 210 includes a display panel. The display panel may employ, for example, a Liquid Crystal Display (LCD) or an Active Matrix Organic Light Emitting Diode (AM-OLED). In this case, the display 210 further includes a controller for controlling the display panel. The display panel may be, for example, flexible, transparent, or wearable.

The display 210 may have the form of a touch screen with a touch panel coupled thereto. For example, the touch screen may include an integral module in which a display panel and a touch panel are coupled to each other in a stack structure.

The touch panel may recognize a user's touch input based on at least one of, for example, a capacitive type, a resistive type, an infrared type, and an acoustic wave type. The touch panel may further include a controller. In the case of a capacitive type touch panel, proximity awareness may be possible in addition to direct touch. The touch panel may further include a tactile layer. In this case, the touch panel may provide a user with a tactile reaction.

The user input unit 220 receives various instructions from a user. The user input unit 220 includes at least one of, for example, a pen sensor 221 and a key 222.

For example, the pen sensor 221 may be realized using a separate pen recognition sheet in the same way as receiving a user's touch input.

The key 222 may include, for example, a mechanical key or a touch key. For example, the mechanical key may include at least one of a power button provided at one side of the electronic device 200 and the external electronic device 300 to turn on a display thereof when pushed, one or more volume buttons located at the other side of the electronic device 200 and the external electronic device 300 to control volume when pushed, and a home button provided at a lower central portion of the display 210 of the electronic device 200 and the external electronic device 300 to perform switching to a home screen when pushed.

The touch key may include at least one of, for example, a menu key provided on one surface of a lower end of the display 210 of the electronic device 200 and the external electronic device 300 to provide a menu related to currently displayed content when touched, and a back key provided on another surface of the lower end of the display 210 of the electronic device 200 and external electronic device 300 to provide a function of returning to a previous screen of the currently displayed screen when touched.

The communication unit 230 includes at least one of a mobile communication unit 231, a wireless Internet unit 232, a short-range communication unit 233, and a location information unit 234.

The mobile communication unit 231 transmits/receives a wireless signal to/from at least one of a base station, an external mobile station, and a server in the mobile communication network. The wireless signal may include various types of data according to transmission/reception of a voice call signal, a video call signal, an SMS/multimedia message.

The wireless Internet unit 232 accesses a wireless Internet. Examples of wireless Internet technology include Wireless Local Area Network (WLAN) (Wi-Fi), Wireless Broadband (WiBro), World Interoperability for Microwave Access (WIMAX), and High Speed Downlink Packet Access (HSDPA).

The short-range communication unit 233 provides short-range communication. Examples of the short-range communication technology include Bluetooth, Radio Frequency Identification (RFID), Infrared Data Association (IrDA), Ultra Wideband (UWB), and ZigBee.

The location information unit 234 acquires or identifies locations of the electronic device 200 and external electronic device 300. The location information unit 234 acquires location information using a Global Navigation Satellite System (GNSS). The term "Global Navigation Satellite System (GNSS)" refers to radio navigation satellite systems moving around the Earth and sending reference signals with which predetermined types of radio navigation receivers can determine locations thereof on or near the surface of the Earth.

Examples of the GNSS includes a Global Position System (GPS) operated by the U.S., Galileo operated by Europe, a Global Orbiting Navigational Satellite System (GLONASS) operated by Russia, COMPASS operated by China, and Quasi-Zenith Satellite System (QZSS) operated by Japan.

Additionally, the communication unit 230 includes a network interface (e.g., a LAN card) or modem for connecting the electronic device 200 and the external electronic device 300 to a network (e.g., Internet, Local Area Network (LAN), Wire Area Network (WAN), Telecommunication Network, Cellular Network, Satellite Network, or Plain Old Telephone Service (POTS)).

The memory 240 includes at least one of an internal memory 241 and an external memory 242.

The internal memory 242 includes at least one of a volatile memory (e.g., a Dynamic Random Access Memory (DRAM) and a Synchronous Dynamic RAM (SDRAM)), a non-volatile memory (e.g., an One Time Programmable Read-Only Memory (OTPROM), a Programmable ROM (PROM), an Erasable and Programmable ROM (EPROM), an Electrically Erasable and Programmable ROM (EEPROM), a Mask ROM, and a Flash ROM), a Hard Disk Drive (HDD), and a Solid State Drive (SSD). According to an embodiment of the present invention, the processor 280 loads instructions or data received from at least one of a nonvolatile memory and other elements in a volatile memory and processes the loaded instructions or data. In addition, the processor 280 stores data received or generated from the other elements in a volatile memory.

The external memory 242 includes at least one of, for example, a Compact Flash (CF) memory, a Secure Digital (SD) memory, a Micro Secure Digital (Micro-SD) memory, a Mini Secure Digital (Mini-SD) memory, an extreme Digital (xD) memory, and a memory stick.

The memory 240 stores an operating system for controlling resources of the electronic device 200 and the external electronic device 300 and programs for operating applications. The operating system includes a kernel, middleware, and an Application Program Interface (API). Examples of the operating system include Android, iOS, Windows®, Symbian, Tizen™, and Bada.

The kernel includes a system resource manager capable of managing resources or a device driver. The resource manager may include, for example, a process manager, a memory manager, or a file system manager and perform a function of controlling, allocating, or withdrawing system resources. The device driver may allow various elements of the electronic device 200 and the external electronic device 300 to be controlled via software access methods.

In this case, the device driver may be divided into an interface and an individual driver module provided by a hardware maker. The device driver may include at least one of, for example, a display driver, a camera driver, a Bluetooth driver, a shard-memory driver, a USB driver, a keypad driver, a Wi-Fi driver, an audio driver, and an Inter-Process Communication driver (IPC).

The middleware may include a plurality of modules implemented in advance to provide functions commonly required for various applications. The middleware may provide common necessary functions through the API such that an application may efficiently use limited system resources within an electronic device. The middleware may include at least one of, for example, an application manager, a window manager, a multimedia manager, a resource manager, a power manager, a database manager, and a package manager.

In addition, the middleware may include at least one of a connectivity manager, a notification manager, a location manager, a graphic manager, and a security manager according to implemented embodiments. Furthermore, the middleware may include a runtime library or other library modules according to an embodiment of the present invention. The runtime library is a library module that a compiler uses to add a new function via a programming language while an application is being executed.

For example, the runtime library may perform functions for input/output, memory management, or arithmetic functions. The middleware may create and use a new middleware module via various functional combinations of the aforementioned internal element modules. Meanwhile, the middleware may provide a specialized module according to the type of an operating system to provide a differentiated function.

The API corresponds to a set of API programming functions and may be provided to have a different configuration according to the operating system. For example, in the case of Android or iOS, one API set may be provided for each platform, and in the case of Tizen™, two or more API sets may be provided.

The application may perform one or more functions using an application program. The application may be classified into, for example, a preloaded application and a third party application. The application may include, for example, a home application for executing a home screen, a dialer application, a Short Message Server (SMS)/Multi-Media Message (MMS) application, an Instant Message (IM) application, a browser application, a camera application, an alarm application, a contacts (or address book) application, a voice dial application, an email application, a calendar application, a media player, an album application, and a clock application.

The sensor unit 250 includes, for example, a gesture sensor 251, a gyro sensor 252, a magnetic sensor 253, an acceleration sensor 254, a proximity sensor 255, and an illumination sensor 256.

The audio unit 260 bilaterally converts voice and an electrical signal. The audio unit 260 includes at least one of, for example, a speaker, a receiver, earphones, and a microphone and converts voice information into input or output.

The camera unit 270 performs a function of capturing a still image and a moving image. The camera unit 270 includes one or more image sensors (e.g., a front lens or a back lens), an Image Signal Processor (ISP), or a flash Light Emitting Diode (LED) according to an embodiment of the present invention.

The processor 280 controls a plurality of hardware and software elements connected thereto and processes and calculates various types of data including multimedia data, by driving an operating system and an application program. For example, the processor 280 may provide fingerprint input guide information via the display 210 or perform authentication or registration of a user using the acquired fingerprint image of the user. The processor 280 may be implemented by, for example, a System on Chip (SoC) and may further include a Graphics Processing Unit (GPU).

The names of the elements of the aforementioned electronic device 200 and external electronic device 300 may be changed. In addition, the electronic device 200 and external electronic device 300 according to the present invention may include at least one of the aforementioned elements, omit some elements, or further include other additional elements.

Figure 5:
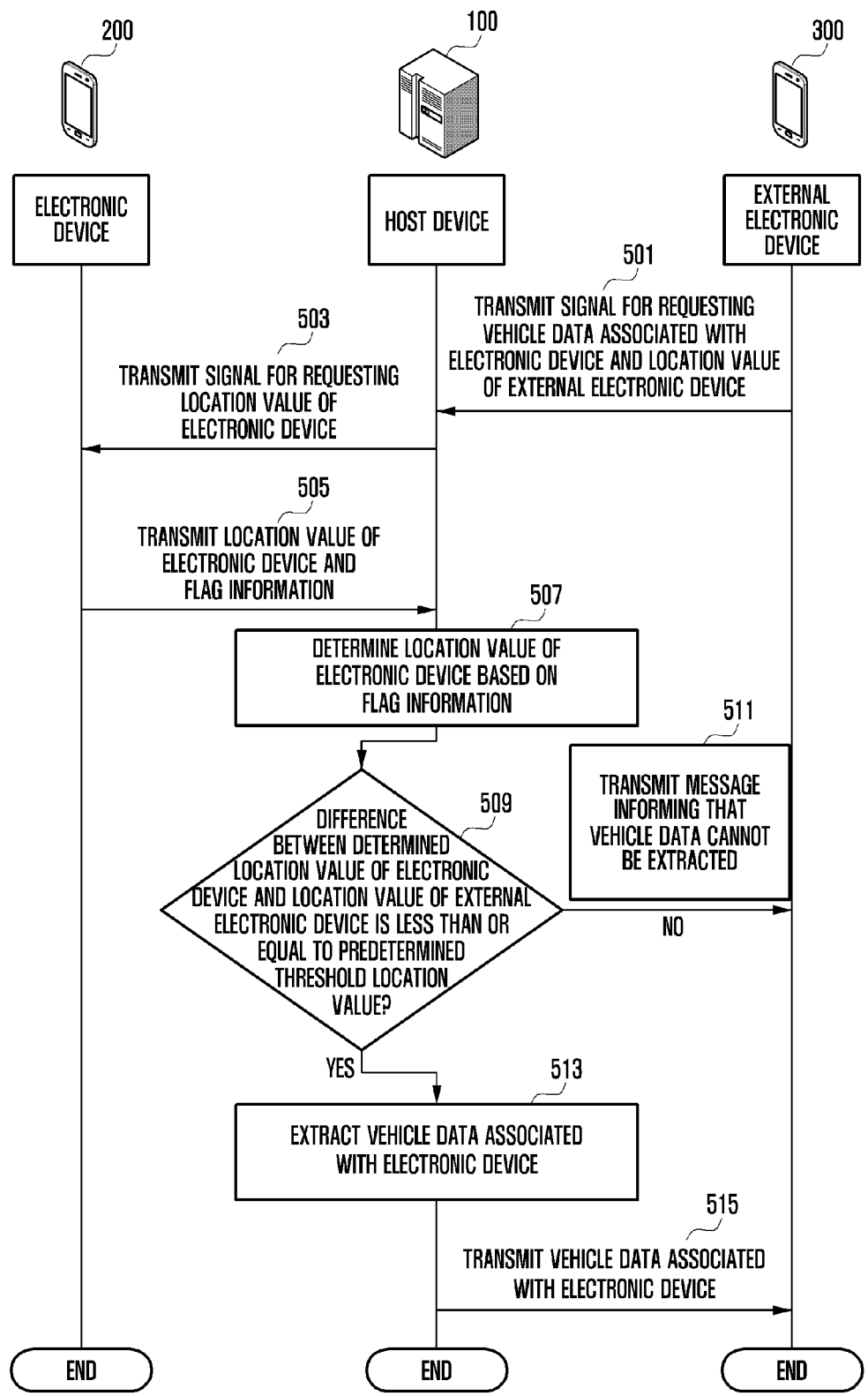
FIG. 5 is a signal flow diagram illustrating a method of searching for a contact number according to an embodiment of the present invention.

FIG. 5 is a signal flow diagram illustrating a method of searching for a contact number according to an embodiment of the present invention.

According to an embodiment of the present invention, in step 501, the external electronic device 300 transmits a signal for requesting vehicle data associated with the electronic device 200 and a location value of the external electronic device 300 to the host device 100. The signal for requesting vehicle data associated with the electronic device 200 may include at least one of a text signal and an image signal for a vehicle number associated with the electronic device 200. For example, a user using the external electronic device 300 may input the vehicle number associated with the electronic device 200 directly or using the camera unit 270.

A communication unit 230 transmits the input vehicle number associated with the electronic device to the host device 100. In addition, the location value of the external electronic device 300 may refer to a current location value (e.g., the latitude and longitude) of the external electronic device 300 measured by the sensor unit 250. The measured location value of the external electronic device 300 is transmitted to the host device 100 via the communication unit 230.

In step 503, the host device 100 transmits a signal for requesting a location value of the electronic device 200. In step 505, the electronic device 200 transmits the location value thereof and flag information. Here, the location value of the electronic device 200 may refer to a location value of the electronic device 200 measured by the sensor unit 250. More specifically, the location value of the electronic device 300 may refer to the latitude and longitude of the electronic device 200. In addition, the flag information may refer to constant flag information representing that the location value of the electronic device 200 is fixed or variable flag information representing that the location value of the electronic device 200 may be varied. More specifically, the location value of the external electronic device 300 may refer to the latitude and longitude of the external electronic device 300.

In step 507, the host device 100 determines the location value of the electronic device 200, based on the received flag information. For example, when the received flag information corresponds to constant flag information, the host device 100 determines the location value received from the electronic device 200 as the location value of the electronic device 200. In contrast, when the received flag information corresponds to variable flag information, the host device 100 receives the location value from the electronic device 200 and determines a location value received at a time point (e.g., at a preset time, shortly before a comparison between the location values of the external electronic device 200 and the external electronic device 300, or when the location value of the electronic device 200 is most recently received) as the location value of the electronic device 200.

In step 509, the host device 100 determines whether a difference between the determined location value of the electronic device 200 and the location value of the external electronic device 300 is less than or equal to a predetermined threshold location value. For example, when the electronic device 200 is located at a latitude of 35.4242 degrees north and a longitude of 134.233 degrees east, the external electronic device 300 is located at a latitude of 35.3333 degrees north and a longitude of 133.003 degrees east, and a predetermined threshold location value corresponds to a latitude of 4 degrees north and a longitude of 4 degrees east, the host device 100 may determine that a difference between the location values of the external electronic devices 200 and the external electronic device 300 is less than or equal to the predetermined threshold location value.

When it is determined that the difference is greater than the predetermined threshold location value, the host device 100 transmits a message informing that the vehicle data associated with the electronic device 200 cannot be extracted to the external electronic device 300 in step 511.

When it is determined that the difference is less than or equal to the predetermined threshold location value, the host device 100 extracts the vehicle data associated with the electronic device 200 in step 513. In this case, the vehicle data corresponds to the signal requested by the external electronic device 300. For example, the vehicle data may include at least one of the text signal and the image signal for the vehicle number associated with the electronic device.

In step 515, the host device 100 transmits the vehicle data associated with the electronic device 200 to the external electronic device 300. For example, when the external electronic device 300 has requested a virtual contact number as the vehicle data associated with the electronic device 200, the host device 100 transmits the virtual contact number to the external electronic device 300. If the external electronic device 300 has requested a memo list as the vehicle data associated with the electronic device 200, the host device 100 transmits the memo list to the external electronic device 300.

Figure 6:
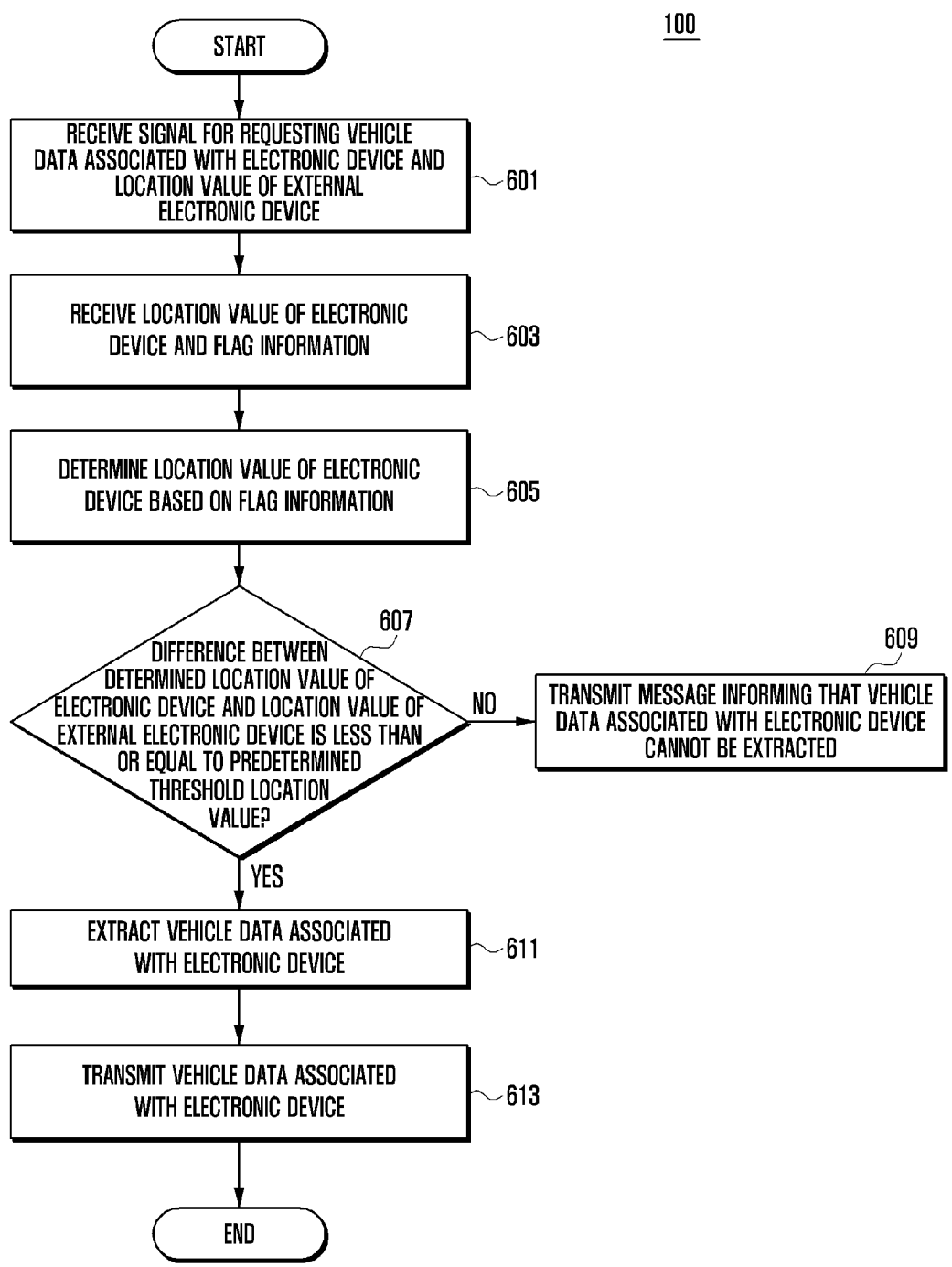
FIG. 6 is a flowchart illustrating a method of searching for a contact number according to an embodiment of the present invention.

FIG. 6 is a flowchart illustrating a method of searching for a contact number according to an embodiment of the present invention.

According to an embodiment of the present invention, in step 601, a host device 100 receives, from a external electronic device 300, a signal for requesting vehicle data associated with a electronic device 200 and a location value of the external electronic device 300. The signal for requesting vehicle data associated with the electronic device 200 may include at least one of a text signal and an image signal for a vehicle number associated with the electronic device 200. For example, the signal for requesting the vehicle data may include a text signal for the vehicle number "04 GA 3158" or an image of the vehicle number acquired via a camera unit 270 of the external electronic device 300. The location value of the external electronic device 300 may refer to a location value of the external electronic device 300 measured by a sensor unit 250. More specifically, the location value of the external electronic device 300 may refer to the latitude and longitude of the external electronic device 300.

The host device 100 transmits, to the electronic device 200, a signal for requesting a location value of the electronic device 200. In response to the request signal, the host device 100 receives the location information of the electronic device 200 and flag information from the electronic device 200 in step 603. Here, the location value of the electronic device 200 may refer to a location value of the electronic device 200 measured by the sensor unit 250. More specifically, the location value of the electronic device 300 may refer to the latitude and longitude of the electronic device 200. In addition, the flag information may refer to constant flag information representing that the location value of the electronic device 200 is fixed or variable flag information representing that the location value of the electronic device 200 may be varied.

In step 605, the host device 100 determines the location value of the electronic device 200, based on the flag information. For example, when the received flag information corresponds to constant flag information, the host device 100 may determine the location value received from the electronic device 200 as the location value of the electronic device 200. In contrast, when the received flag information corresponds to variable flag information, the host device 100 may consistently receive the location value from the electronic device 200 and determine a location value received at a time point (e.g., at a preset time, shortly before a comparison between the location values of the electronic device 200 and the external electronic device 300, or when the location value of the electronic device 200 is most recently received) as the location value of the electronic device 200.

In step 607, the host device 100 determines whether a difference between the determined location value of the electronic device 200 and the location value of the external electronic device 300 is less than or equal to a predetermined threshold location value. For example, when the electronic device 200 is located at a latitude of 35.4242 degrees north and a longitude of 134.233 degrees east, the external electronic device 300 is located at a latitude of 35.3333 degrees north and a longitude of 133.003 degrees east, and a predetermined threshold location value corresponds to a latitude of 4 degrees north and a longitude of 4 degrees east, the host device 100 may determine that a difference between the location values of the electronic device 200 and the external electronic device 300 is less than or equal to the predetermined threshold location value.

When it is determined that the difference is greater than the predetermined threshold location value, the host device 100 transmits a message, informing that the vehicle data involved in the electronic device 200 cannot be extracted, to the external electronic device 300 in step 609.

When it is determined that the difference between the location values of the electronic device 200 and the external electronic device 300 is less than or equal to the predetermined threshold location value, the host device 100 extracts the vehicle data involved in the electronic device 200 in step 611. In this case, the vehicle data corresponds to the signal requested by the external electronic device 300. For example, the vehicle data may include at least one of the text signal and the image signal for the vehicle number involved in the electronic device. In step 613, the host device 100 transmits the vehicle data associated with the electronic device 100 to the external electronic device 300.

Figure 7:
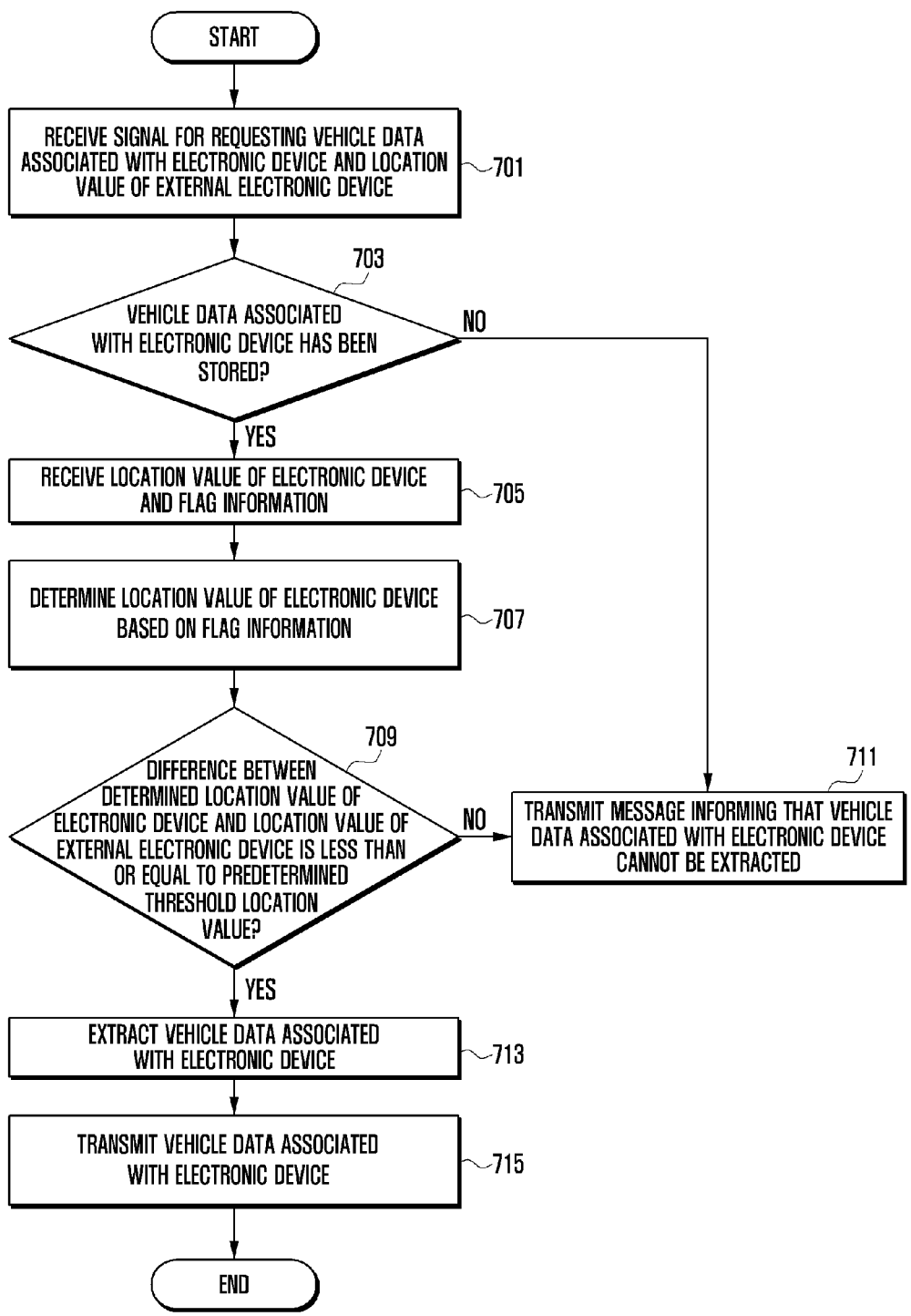
FIG. 7 is a flowchart illustrating a method of searching for a contact number according to an embodiment of the present invention.

FIG. 7 is a flowchart illustrating a method of searching for a contact number according to an embodiment of the present invention.

According to an embodiment of the present invention, in step 701, a host device 100 receives, from the external electronic device 300, a signal for requesting vehicle data associated with the electronic device 200 and a location value of the external electronic device 300. The signal for requesting vehicle data involved in the electronic device 200 may include at least one of a text signal and an image signal for a vehicle number involved in the electronic device 200. For example, the signal for requesting the vehicle data may include a text signal for the vehicle number "03 GA 4587" or an image for the vehicle number acquired through a camera unit 270 of the external electronic device 300. The location value of the external electronic device 300 may refer to a location value of the external electronic device 300 measured by a sensor unit 250. More specifically, the location value of the external electronic device 300 may refer to the latitude and longitude of the external electronic device 300.

In step 703, the host device 100 determines whether the vehicle data involved in the electronic device 200 has been stored. When receiving the signal for requesting the vehicle data associated with the electronic device 200, the host device 100 determines whether the vehicle number involved in the electronic device 200 has been stored in a vehicle-number and contact-number storing module 121.

The host device 100 transmits, to the electronic device 200, a signal for requesting a location value of the electronic device 200. In response to the request signal, the host device 100 receives the location information of the electronic device 200 and flag information from the electronic device 200 in step 705. In this case, the location value of the electronic device 200 may refer to a location value of the electronic device 200 measured by the sensor unit 250. More specifically, the location value of the electronic device 300 may refer to the latitude and longitude of the electronic device 200. In addition, the flag information may refer to constant flag information representing that the location value of the electronic device 200 is fixed or variable flag information representing that the location value of the electronic device 200 may be varied.

In step 707, the host device 100 determines the location value of the electronic device 200, based on the flag information. For example, when the received flag information corresponds to constant flag information, the host device 100 determines the location value received from the electronic device 200 as the location value of the electronic device 200. In contrast, when the received flag information corresponds to variable flag information, the host device 100 receives the location value from the electronic device 200 and determines a location value received at a time point (e.g., at a preset time, shortly before a comparison between the location values of the electronic device 200 and and the external electronic device 300, or when the location value of the electronic device 200 is most recently received) as the location value of the electronic device 200.

In step 709, the host device 100 determines whether a difference between the determined location value of the electronic device 200 and the location value of the external electronic device 300 is less than or equal to a predetermined threshold location value. For example, when the electronic device 200 is located at a latitude of 35.4242 degrees north and a longitude of 134.233 degrees east, the external electronic device 300 is located at a latitude of 35.3333 degrees North and a longitude of 133.003 degrees East, and a predetermined threshold location value corresponds to a latitude of 4 degrees North and a longitude of 4 degrees East, the host device 100 may determine that a difference between the location values of the electronic device 200 and the external electronic device 300 is less than or equal to the predetermined threshold location value.

When it is determined that the difference between the location values of the electronic device 200 and the external electronic device 300 is greater than the threshold location value or the vehicle data has not been stored in the vehicle-number and contact-number storing module 121, in step 711, the host device 100 transmits a message informing that the vehicle data associated with the electronic device 300 cannot be extracted.

When it is determined that the difference between the location values of the electronic device 200 and the external electronic device 300 is less than or equal to the predetermined threshold location value, the host device 100 extracts the vehicle data involved in the electronic device 200 in step 713. In this case, the vehicle data corresponds to the signal requested by the external electronic device 300. For example, the vehicle data may include at least one of the text signal and the image signal for the vehicle number involved in the electronic device. In step 713, the host device 100 transmits the extracted vehicle data associated with the electronic device 100 to the external electronic device 300.

The programming module according to the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

Meanwhile, the embodiments of the present invention disclosed in the specification and drawings are merely presented to easily describe technical contents of the present invention and help in the understanding of the present invention and are not intended to limit the scope of the present invention. Therefore, all changes or modifications derived from the technical idea of the present invention as well as the embodiments described herein should be interpreted to be within the scope and spirit of the present invention, as defined by the appended claims and their equivalents.

What is claimed is:

1. A method of searching for vehicle data by a host device, comprising:
   receiving a signal for requesting vehicle data of a first mobile station and a location value of a second mobile station;
   receiving a location value and flag information of the first mobile station;
   determining the location value of the first mobile station based on the flag information;
   determining whether a difference between the determined location value of the first mobile station and the location value of the second mobile station is less than or equal to a predetermined threshold location value;
   extracting the vehicle data of the first mobile station based on the determination result as to whether the difference is less than or equal to the predetermined threshold location;
   transmitting the extracted vehicle data of the first mobile station;
   determining whether the vehicle data of the first mobile station has been stored, after receiving the signal for requesting the vehicle data of the first mobile station and the location value of the second mobile station; and
   transmitting a message informing that it is impossible to extract the vehicle data of the first mobile station, when it is determined that the vehicle data of the first mobile station has not been stored.

2. The method of claim 1, wherein the vehicle data of the first mobile station comprises at least one of virtual contact number data and memo list data.

3. The method of claim 1, further comprising:
determining whether a connection between the first mobile station and a vehicle corresponding thereto has been activated, based on the flag information.

4. The method of claim 2, wherein the threshold location value is determined by applying at least one of the following:
determining the threshold location value according to whether the vehicle data of the first mobile station is the virtual contact number data or the memo list data; and
determining the threshold location value according to whether the flag information is constant flag information representing that the location value of the first mobile station is fixed or variable flag information representing that the location value of the first mobile station is varied.

5. The method of claim 2, wherein the virtual contact number data is changed every preset period.

6. The method of claim 1, wherein the signal for requesting the vehicle data of the first mobile station comprises at least one of text and image signals of a vehicle number of the first mobile station.

7. The method of claim 2, further comprising:
transmitting a memo notification signal to the first mobile station, when it is detected that the memo list data is changed.

8. A host device, comprising:
a wireless communication unit configured to receive a signal for requesting vehicle data of a first mobile station, a location value of a second mobile station, and a location value and flag information of the first mobile station;
a vehicle number search module configured to determine whether a vehicle number of the first mobile station has been stored in a vehicle-number and contact-number storing module, when the wireless communication unit receives the signal for requesting the vehicle data of the first mobile station; and
a controller configured to determine a location value of the first mobile station based on the flag information, judge whether a difference between the determined location value of the first mobile station and the location value of the second mobile station is less than or equal to a predetermined threshold location value, extract the vehicle data of the first mobile station based on the judgment result as to whether the difference is less than or equal to the predetermined threshold location, and control the wireless communication unit to transmit a message informing that it is impossible to extract the vehicle data of the first mobile station, when it is determined that the vehicle data of the first mobile station has not been stored.

9. The host device of claim 8, wherein the wireless communication unit is further configured to transmit the extracted vehicle data of the first mobile station to the second mobile station.

10. The host device of claim 9, further comprising:
a storage unit that comprises a vehicle-number and contact-number storing module configured to store a vehicle number of the first mobile station and a virtual contact number corresponding to the vehicle number, and a virtual memo storing module configured to store a memo list corresponding to the vehicle number.

11. The host device of claim 8, wherein the vehicle data of the first mobile station comprises at least one of virtual contact number data and memo list data.

12. The host device of claim 11, wherein the controller is further configured to determine whether a connection between the first mobile station and a vehicle corresponding to the first mobile station has been activated, based on the flag information.

13. The host device of claim 12, wherein the threshold location value is determined according to whether the vehicle data of the first mobile station is the virtual contact number data or the memo list data or whether the flag information is constant flag information representing that the location value of the first mobile station is fixed or variable flag information representing that the location value of the first mobile station is varied.

14. The host device of claim 11, wherein the virtual contact number data is changed every preset period.

15. The host device of claim 8, wherein the signal for requesting the vehicle data of the first mobile station comprises at least one of text and image signals of a vehicle number of the first mobile station.

16. The host device of claim 11, wherein the controller is further configured to control the wireless communication unit to transmit a memo notification signal to the first mobile station, when it is detected that the memo list data is changed.

* * * * *